United States Patent
Park et al.

(10) Patent No.: US 9,460,227 B2
(45) Date of Patent: Oct. 4, 2016

(54) ELECTRONIC DEVICE AND METHOD FOR DISPLAYING WEB HISTORY THEREOF

(75) Inventors: Youndong Park, Seoul (KR); Yongtaek Gong, Gyeonggi-Do (KR); Yongkyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 198 days.

(21) Appl. No.: 14/354,912

(22) PCT Filed: Apr. 2, 2012

(86) PCT No.: PCT/KR2012/002442
§ 371 (c)(1),
(2), (4) Date: Apr. 28, 2014

(87) PCT Pub. No.: WO2013/077503
PCT Pub. Date: May 30, 2013

(65) Prior Publication Data
US 2014/0304272 A1    Oct. 9, 2014

(30) Foreign Application Priority Data
Nov. 22, 2011  (KR) .................. 10-2011-0122443

(51) Int. Cl.
*G06F 17/30*   (2006.01)
*G09G 5/14*    (2006.01)

(52) U.S. Cl.
CPC ..... *G06F 17/3089* (2013.01); *G06F 17/30873* (2013.01); *G09G 5/14* (2013.01); *G09G 2370/027* (2013.01)

(58) Field of Classification Search
None
See application file for complete search history.

(56) References Cited

U.S. PATENT DOCUMENTS

| | | |
|---|---|---|
| 2002/0087599 A1 | 7/2002 | Grant et al. |
| 2005/0144162 A1* | 6/2005 | Liang ............... G06F 17/30109 |
| 2005/0234940 A1 | 10/2005 | Apparao et al. |
| 2008/0034039 A1* | 2/2008 | Cisler .................. G06F 3/0483 709/204 |

FOREIGN PATENT DOCUMENTS

| | | |
|---|---|---|
| KR | 1020090112256 A | 10/2009 |
| KR | 1020100061770 A | 6/2010 |

* cited by examiner

*Primary Examiner* — Syed Hasan
(74) *Attorney, Agent, or Firm* — Lee, Hong, Degerman, Kang & Waimey; Jonathan Kang; Harry Lee (57) ABSTRACT

A method for displaying web histories in an electronic device includes displaying at least one webpage through a web browser in response to a user input, and displaying a list of web histories for previously displayed webpages when receiving a request for a webpage visit record, wherein the web history is generated by sorting webpages by each category.

17 Claims, 6 Drawing Sheets

ELECTRONIC DEVICE AND METHOD FOR DISPLAYING WEB HISTORY THEREOF

CROSS-REFERENCE TO RELATED APPLICATIONS

This application is the National Stage filing under 35 U.S.C. 371 of International Application No. PCT/KR2012/002442, filed on Apr. 2, 2012, which claims the benefit of earlier filing date and right of priority to Korean Application No. 10-2011-0122443, filed on Nov. 22, 2011, the contents of which are all hereby incorporated by reference herein in their entirety.

TECHNICAL FIELD

The present disclosure relates to displaying of web history in an electronic device.

BACKGROUND ART

An electronic device is a device having a circuit based on electronic elements. Especially, a portable electronic device (portable terminal, mobile terminal) is an electronic device, which is easily carried and has one or more functions, such as inputting/outputting information, storing data and the like.

As it becomes multifunctional, the electronic device can be allowed to capture still images or moving images, play music or video files, play games, receive broadcast and the like, so as to be implemented as an integrated multimedia player. Meanwhile, a modem, a dongle and the like as a type of portable electronic device, are external peripheral devices of computers, phones and the like, to provide voice call and telephony call functions to the electronic device main body.

In recent time, an Internet access via various types of electronic devices has been enabled, and accordingly web surfing using such electronic devices has been supported. However, web history provided upon an Internet access via an electronic device is provided merely on a date-basis, a time-basis and the like. Hence, when a user tries to re-search for a webpage which the user has accessed before, the user may suffer from difficulty in search for the exact webpage having accessed.

Also, web pages accessed by the user are not sorted according to specific subjects, consequently, it may be difficult for the user to intuitively search for webpages associated with a subject which the user is interested in.

DISCLOSURE OF INVENTION

Technical Problem

Therefore, an aspect of the detailed description is to provide solutions to obviate those problems.

In detail, an aspect of the detailed description is to provide sorting and displaying of histories for web pages, which have been displayed during web surfing using an electronic device, based on categories.

Another aspect of the detailed description is to provide a method for intuitively providing histories for web pages sorted by categories of interests.

Solution to Problem

To achieve these and other advantages and in accordance with the purpose of the present invention, as embodied and broadly described herein, there is provided a method for displaying web history in an electronic device including displaying at least one webpage through a web browser in response to a user input, and displaying a list of web histories for previously displayed webpages when receiving a request for a webpage visit record, wherein the web histories are sorted by each category.

In one aspect of the detailed description, the web history may include at least one category area where a category-based web history is displayed.

In another aspect of the detailed description, the category area for displaying each category-based web history may be different for each category.

In another aspect of the detailed description, the displaying of the web histories may include changing a category area for defining a category, in response to the user input.

In another aspect of the detailed description, a vertical axis of the web history may be an axis for a category, and a horizontal axis of the web history may be an axis for a time.

In another aspect of the detailed description, the web history may be sorted by each time zone.

In another aspect of the detailed description, the method may further include acquiring history information relating to webpages displayed through the web browser, and sorting the webpages based on the history information by each category.

In another aspect of the detailed description, the method may further include storing the category-based web history based on the sorting result.

In another aspect of the detailed description, the sorting step may include sorting the webpages by each category, based on the information included in the webpages.

In another aspect of the detailed description, the method may further include receiving input of sorting categories for webpages.

In another aspect of the detailed description, the receiving of the input of the sorting categories for the webpages may include generating the sorting categories for webpages.

In another aspect of the detailed description, the receiving of the input of the sorting categories for the webpages may include receiving a selection for the sorting category for webpages.

In accordance with one exemplary embodiment of the detailed description, an electronic device may include a user input unit to receive a user input, a display unit to display at least one webpage through a web browser in response to the received input, and display a list of web histories for previously displayed webpages, a memory to store the web histories, and a controller, wherein the controller may be functionally connected to the user input unit, the display unit and the memory, wherein the controller may sort the at least one webpage displayed through the web browser by each category.

Advantageous Effects of Invention

In accordance with the detailed description, the drawbacks of the related art will be overcome.

In detail, this specification can provide a user with a method for sorting histories for webpages, which were displayed during web surfing using an electronic device, by each category and displaying the sorted categories.

Also, this specification can provide the user with a method for intuitively displaying histories for webpages sorted by categories of interests.

MODE FOR THE INVENTION

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Hereinafter, suffixes "module" and "unit or portion" for components used herein in description are merely provided only for facilitation of preparing this specification, and thus they are not granted a specific meaning or function.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

FIG. 1

Figure 1:
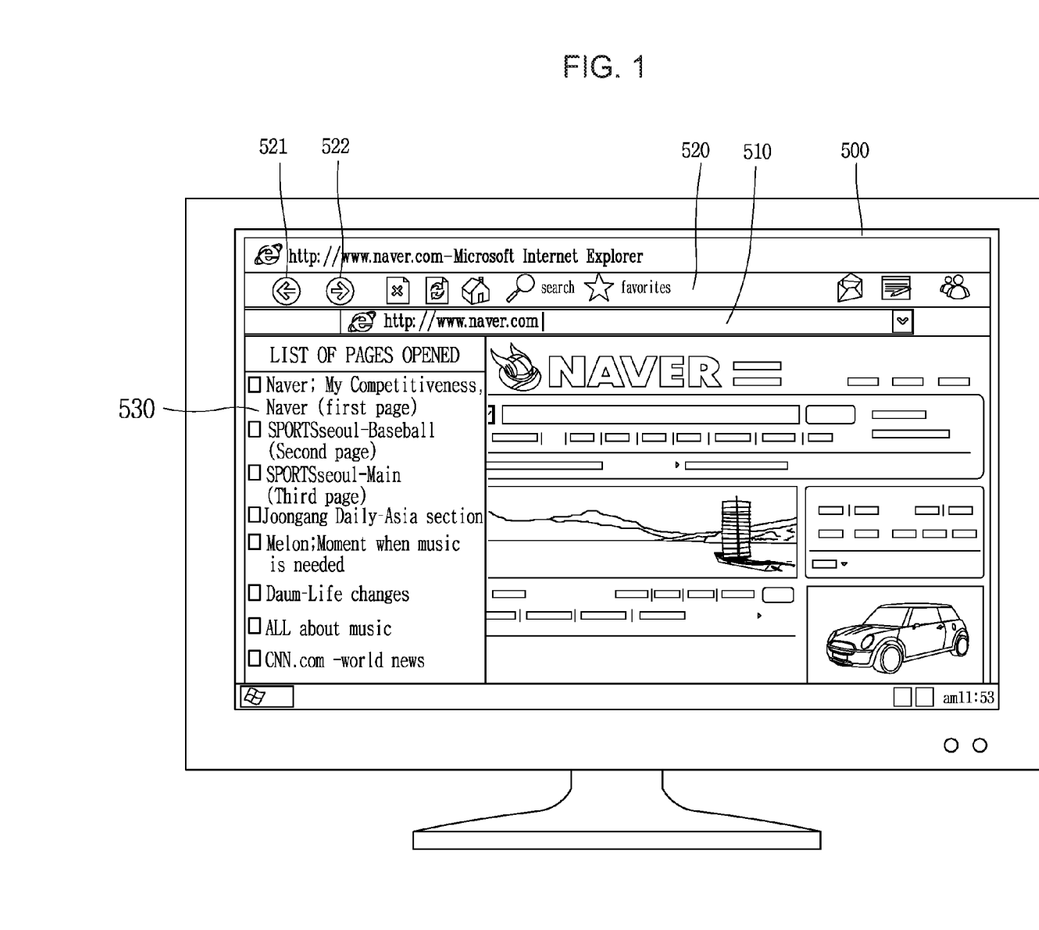
FIG. 1 shows an exemplary web browser of an electronic device.

FIG. 1 shows an exemplary web browser of an electronic device.

As shown in FIG. 1, a web browser 500 may include an address input window 510 for allowing inputting of an address of a webpage, and a plurality of functional buttons 520. The functional buttons 520 may include a button 521 for moving back to a webpage just before a currently displayed webpage, and a button 522 for moving to a next webpage.

The 'move back' button 521 is a button for redisplaying a webpage (for example, second page) displayed before the currently displayed webpage (for example, first page), and the 'move to' button 522 is a button for redisplaying a webpage (for example, the first page) before moving back to the previous webpage (for example, the second page). That is, the moving of the webpage in the exemplary embodiment indicates redisplaying of one of the previously displayed webpage and the currently displayed webpage.

The moving of the webpages by inputting the buttons 521 and 522 for moving (back to and to) a webpage, as aforementioned, without input of an address of a webpage on the address input window 510, is enabled as a controller of the electronic device sequentially remembers addresses of displayed webpages in the sequence of the webpages being displayed every time when those webpages are displayed.

In addition, the history of each webpage displayed may be displayed in form of a list 530. When using the webpage list 530, it may be facilitated to move to a webpage before several stages.

As the history of each webpage is remembered, a user may easily move from the currently displayed webpage to the previously displayed webpage using the buttons 521 and 522 for movement (back or toward).

However, the webpage history merely displays every webpage in the sequence of being displayed.

Hence, when the user tries to visit again a webpage which the user has visited before, a long time may be taken to search for an exactly desired webpage. In addition, when the user desires to check a webpage associated with a specific category, the user may suffer from checking categories of webpages displayed in the web history one by one.

FIG. 2

Figure 2:
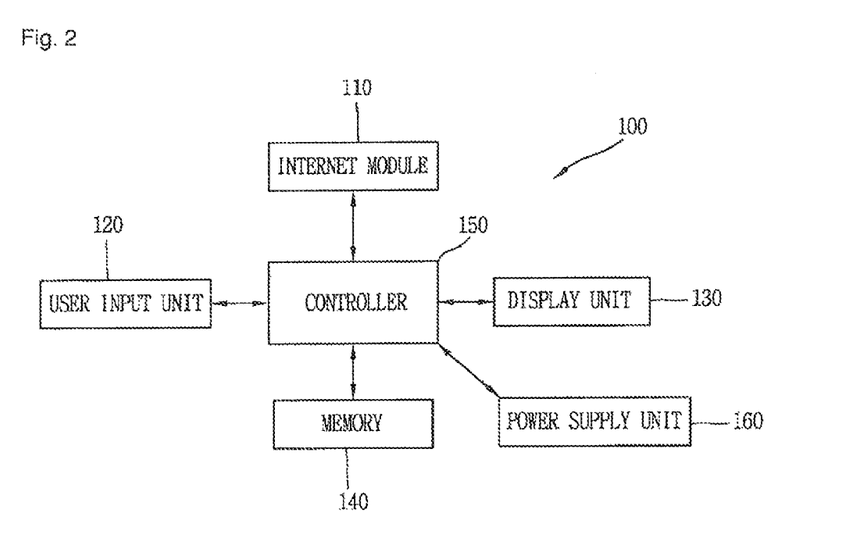
FIG. 2 is a block diagram of an electronic device in accordance with one exemplary embodiment.

FIG. 2 is a block diagram of an electronic device 100 in accordance with one exemplary embodiment.

An electronic device 100 described in this specification may include portable electronic devices (portable terminals, mobile terminals), stationary terminals and the like.

Portable terminals described in this specification may include cellular phones, smart phones, laptop computers, digital broadcasting terminals, personal digital assistants (PDAs), portable multimedia players (PMPs), E-books, navigators, and the like. Also, stationary terminals described in this specification may include digital TVs, digital frames, desktop computers and the like.

The electronic device 100 may include an Internet module 110, a user input unit 120, a display unit 130, a memory 140, a controller 150, a power supply unit 160 and the like. FIG. 2 shows the electronic device 100 having various components, but it is understood that implementing all of the illustrated components is not a requirement. Greater or fewer components may alternatively be implemented.

The Internet module 110 indicates a module for an Internet access, and may be internally or externally coupled to the electronic device 100.

The user input unit 120 may generate input data for a user to control operations of the device. The user input unit 120 may include a keypad, a dome switch, a touchpad (e.g., static pressure/capacitance), a jog wheel, a jog switch and the like.

The display unit 130 may display (output) information processed in the electronic device 100. For example, when the electronic device 100 executes a web browser, the display unit 130 may display User Interface (UI) or Graphic User Interface (GUI) associated with web surfing. Also, when the electronic device 100 displays web history, the display unit 130 may display UI or GUI associated with displaying of the web history.

The display unit 130 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

The memory 140 may store a program for operations of the controller 150, or temporarily store input/output data (e.g., addresses of webpages visited during web surfing, webpage sorting categories, etc.).

The memory 140 may be implemented using any type of suitable storage medium including a flash memory type, a hard disk type, a multimedia card micro, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the electronic device 100 may operate a web storage which performs the storage function of the memory 140 on the Internet.

The controller 150 typically controls the overall operations of the mobile terminal 100. For example, the controller 150 may perform the control and processing associated with category-based sorting for webpages displayed, category-based web history generation and the like.

The power supply unit 160 may provide power required by various components under the control of the controller 150. The provided power may be internal power, external power, or combination thereof.

FIG. 3

Figure 3:
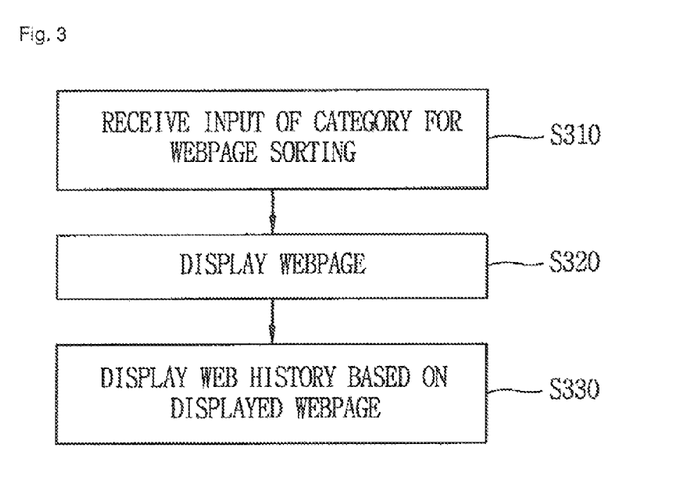
FIG. 3 is a flowchart showing a method for displaying web history in accordance with one exemplary embodiment.

FIG. 3 is a flowchart showing a method for displaying web history in accordance with one exemplary embodiment.

As shown in FIG. 3, the electronic device 100 may receive categories input for webpage sorting (S310).

Hereinafter, description will be given of a detailed example of the one step (S310) shown in FIG. 3.

Figure 4A:
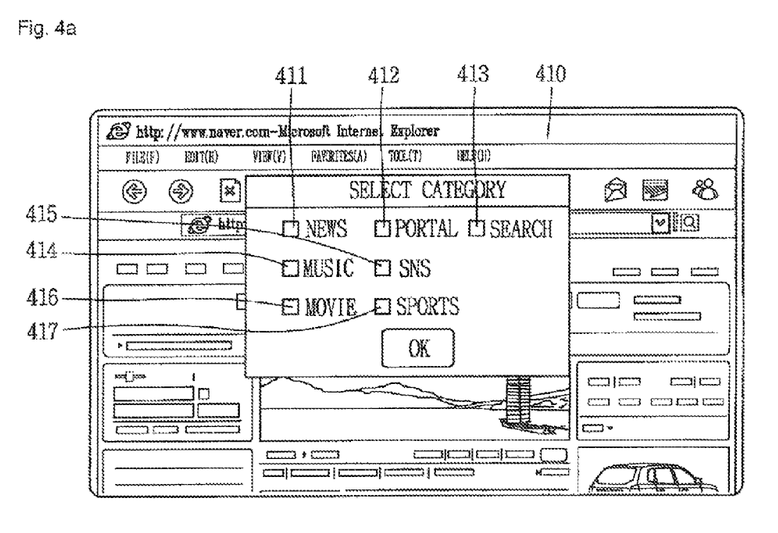
FIGS. 4A and 4B are examples of one process (step) shown in FIG. 3.
Figure 4B:
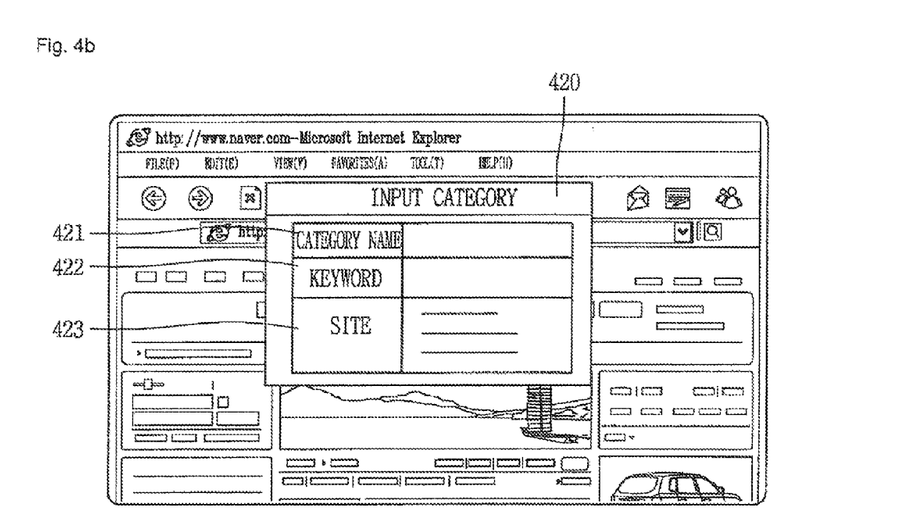

FIGS. 4A and 4B

FIGS. 4A and 4B show an example of the one step (S310) shown in FIG. 3.

As shown in FIGS. 4A and 4B, the electronic device 100 may receive webpage sorting categories.

The sorting categories indicate categories for sorting webpages displayed through a web browser. For example, when the sorting categories are already preset, a webpage displayed through the web browser may be sorted into one of the preset sorting categories.

As shown in FIG. 4A, the electronic device 100 may display a category selection window 410 including preset categories 411 to 417. A user can select a category, which the user desires to use for sorting a webpage, from the displayed category selection window 410. As such, the method of selecting by the user a specific sorting category from the preset sorting categories can be employed to set a category in which a webpage displayed through a web browser is to be sorted.

According to such method, the electronic device 100 can appropriately preset a reference for category sorting, which may result in improvement of accuracy for the category sorting.

As shown in FIG. 4B, the electronic device 100 may display a category generation window 420 for generating a sorting category. The category generation window 420 may include an area for inputting a category name 421 to be generated, an area for inputting a keyword 422 of the category to be generated, an area for inputting a site 423 included in the category to be generated, and the like. The category name 421 indicates a name of a sorting category which is newly generated. The keyword 422 of the category and the site 423 included in the category may be useful to sort a webpage displayed through a web browser.

As such, a new category can be generated through the category generation window 420, which may allow a user to generate various categories when necessary.

In addition to the above method, a method for receiving a category input for webpage sorting may be embodied in various manners.

In the meantime, the electronic device 100 may display a webpage through a web browser (S320).

Here, the electronic device 100 may acquire history information related to the displayed webpage.

The history information may include several information, such as addresses of webpages visited through the web browser, visited date and time, texts and images included in a webpage displayed on the web browser, and the like. Here, the history information may be stored in the memory 140.

The controller 150 may sort webpages visited through the web browser by each category, based on the acquired history information and the like. For example, a specific webpage may be preset to correspond to a specific category. Alternatively, the controller 150 may sort a category for a webpage by determining what kind of contents are included in the corresponding webpage based on text information included in the webpage.

The controller 150 may then generate a category-based web history. The category-based web histories indicate web histories sorted by each category.

FIGS. 5A, 5B, 5C, and 5D

Figure 5A:
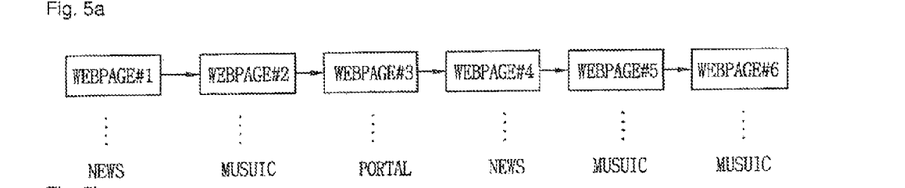
FIGS. 5A, 5B, 5C, and 5D are examples of constructing web history for each category.
Figure 5B:
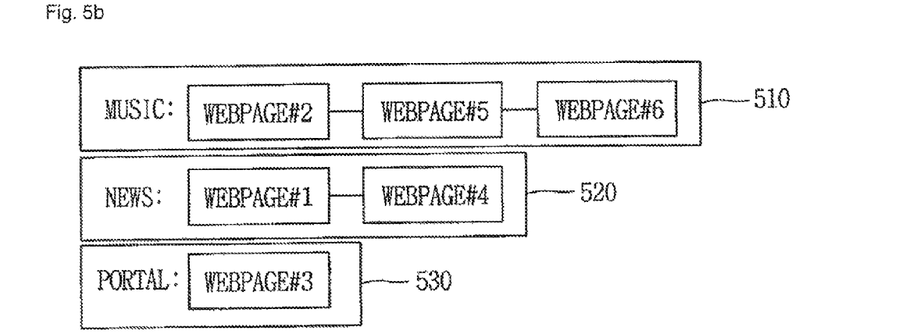

FIGS. 5A and 5B show an example of constructing a category-based web history.

FIG. 5A shows webpages visited by a user through a web browser in a sequential manner. A webpage which the user first visited through the web browser is defined as a webpage #1, and webpages sequentially visited after the webpage #1 are defined as a webpage #2, a webpage #3, a webpage #4, a webpage #5 and a webpage #6. A typical web history, as shown in FIG. 5A, displays the webpages from the webpage #1 to the webpage #6 in a sequential manner.

Meanwhile, the controller 150 may sort a category for each webpage based on the aforementioned category sorting method.

Referring to FIG. 5A, the webpage #1 is sorted into a news category, the webpage #2 is sorted into a music category, the webpage #3 is sorted into a portal category, the webpage #4 is sorted into the news category, the webpage #5 is sorted into the music category, and the webpage #6 is sorted into the music category.

Here, the controller 150 may construct web history for each category.

The webpages sequentially displayed in FIG. 5A are sorted into the corresponding categories so as to generate web histories, examples of which are shown in FIG. 5B.

Among the webpages shown in FIG. 5A, the webpages sorted into the music category are the webpage #2, the webpage #5 and the webpage #6. Therefore, the webpage #2, the webpage #5 and the webpage #6 are sorted into the music category, and a web history 510 for the music category can be constructed.

Among the webpages shown in FIG. 5A, the webpages sorted into the news category are the webpage #1 and the webpage #4. Therefore, the webpage #1 and the webpage #4 are sorted into the news category, and a web history 520 for the news category can be constructed.

Among the webpages shown in FIG. 5A, the webpage sorted into the portal category is the webpage #3. Therefore, the webpage #3 is sorted into the portal category, and a web history 530 for the portal category can be constructed.

Figure 5C:
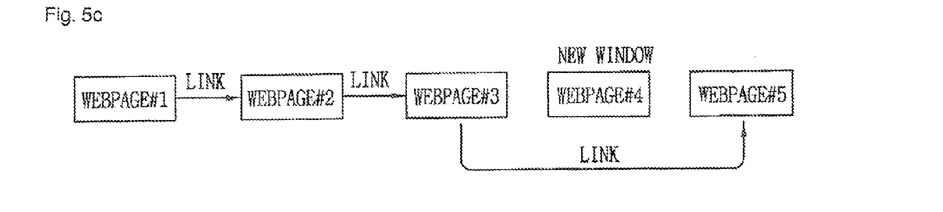
Figure 5D:
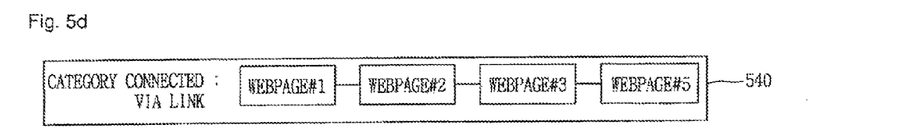

FIGS. 5C and 5D show another example of constructing a category-based web history.

FIG. 5C shows webpages visited by a user through a web browser in a sequential manner. A webpage which the user first visited through the web browser is defined as a webpage #1, and webpages sequentially visited after the webpage #1 are defined as a webpage #2, a webpage #3, a webpage #4 and a webpage #5.

Here, the controller 150 may generate a category-based web history based on whether the user visited a webpage via a link displayed on a webpage or by opening a new window.

Referring to FIG. 5C, after visiting the webpage #1, the user has visited the webpage #2 via a link displayed on the webpage #1. After visiting the webpage #2, the user has visited the webpage #3 via a link displayed on the webpage #2. Afterwards, the user has visited the webpage #4 by opening a new window. After visiting the webpage #4, the user has visited the webpage #5 via a link displayed on the webpage #3.

In this case, in many cases, webpages visited via links may belong to a group of webpages visited for the same purpose. Hence, for user convenience, it is preferable to group a series of webpages visited via links into one category.

Among the webpages shown in FIG. 5C, the webpages visited via the links are the webpage #1, the webpage #2, the webpage #3 and the webpage #5. Therefore, the webpage #1, the webpage #2, the webpage #3 and the webpage #5 may be constructed as a web history 540 for an arbitrary category.

The controller 150 may control category-based web history information to be stored in the memory 140. Every time when the user visits a new webpage, the controller 150 may construct a new web history as aforementioned. Alternatively, when receiving a request for a webpage visit record from the user, the controller 150 may construct a category-based web history.

Figure 6A:
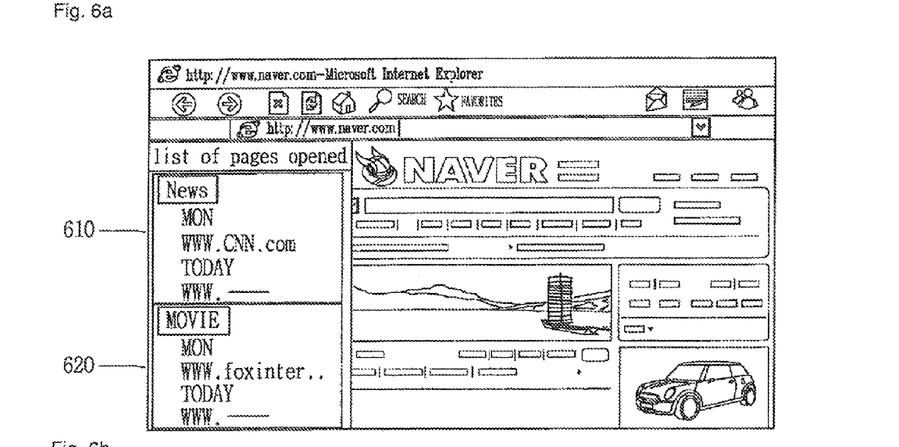
FIGS. 6A and 6B are examples of one process (step) shown in FIG. 3.
Figure 6B:
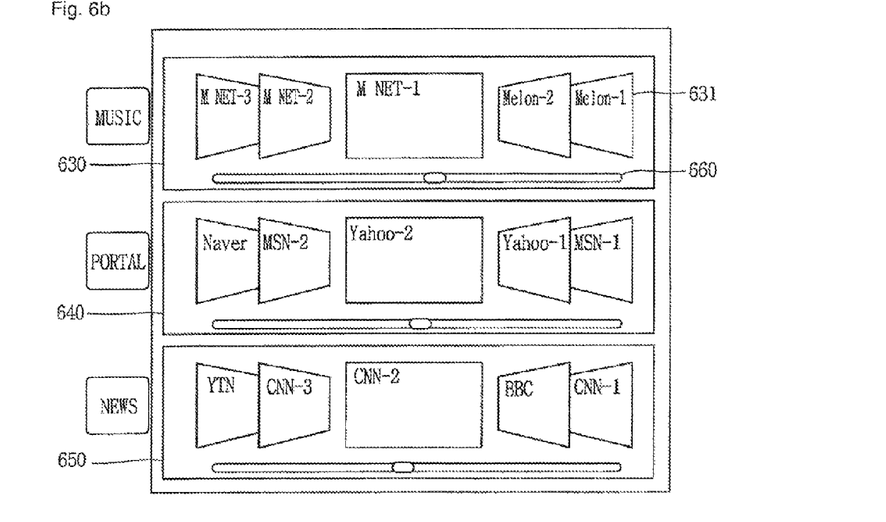

FIGS. 6A and 6B

FIGS. 6A and 6B show an example for one step (S330) shown in FIG. 3.

As shown in FIGS. 6A and 6B, the electronic device 100 may display a category-based web history (S330).

Referring to FIG. 6A, category-based web histories 610 and 620 are displayed. For example, the web history 610 is a web history including webpages associated with news. Also, the web history 620 is a web history including webpages associated with movies. Here, each category-based web history 610 and 620 may include information relating to a sequence (visit sequence) of webpages being visited. The visit sequence may include a date-basis and a time-basis. An area for displaying one category-based web history 610 and an area for displaying another category-based web history 620 may be displayed in a distinguishing manner.

Referring to FIG. 6B, each category-based web history 630, 640 and 650 is displayed in a different manner from the aforementioned method. The web history 630 is a web history including webpages associated with music. The web history 640 is a web history including webpages associated with portal, and the web history 650 is a web history including webpages associated with news. That is, a vertical axis denotes a category, and the controller 150 may display web histories for different categories by varying the vertical axis. In addition, visited webpages may be displayed by being imaged into states that those webpages have been visited. As such, the category-based web histories can be intuitively displayed.

Meanwhile, each of the category-based web histories 630, 640 and 650 may include information relating to a visit sequence of webpages. For example, a horizontal axis of each category-based web history denotes a time axis, so webpages may be displayed on the horizontal axis in the visited sequence. Also, a user may check information relating to webpages included in a web history by use of a scroll bar 660 or the like.

Even here, an area where one category-based web history 630 is displayed and an area where another category-based web history 650 is displayed may be displayed in a distinguishing manner. In addition, a plurality of category-based web histories may be displayed on one screen, so a user can be provided with intuitive interfaces.

When webpages displayed on the category-based web history are sorted different from the user's design, the webpages included in the category-based web history may change based on the user selection.

For example, when the user determines that a webpage 631 included in the category-based web history 630 is appropriate to be included in the category-based web history 640, the user may drag the webpage 631 to the category-based web history 640. Accordingly, the webpage 631 may be set to be deleted from the category-based web history 630 and included in the category-based web history 640.

Figure 7A:
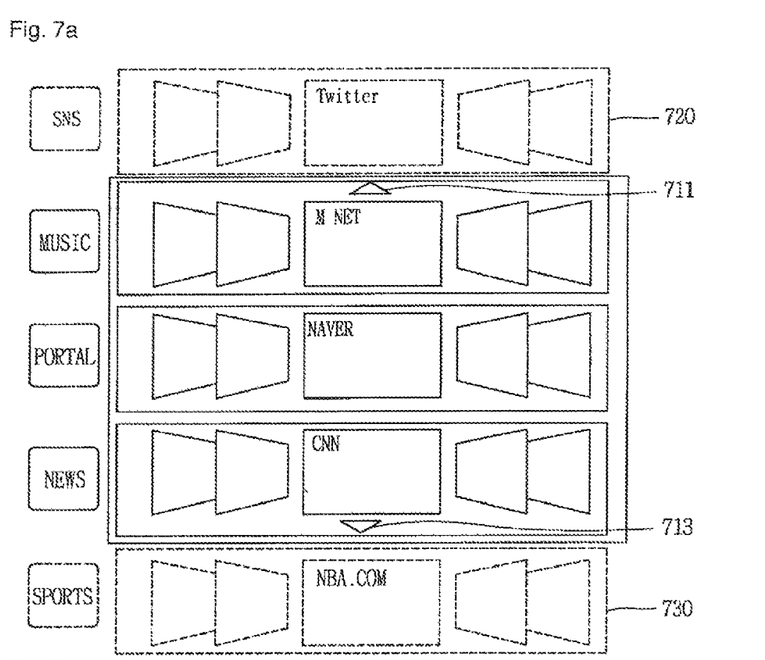
FIGS. 7A and 7B are variations for one process (step) shown in FIG. 3.
Figure 7B:
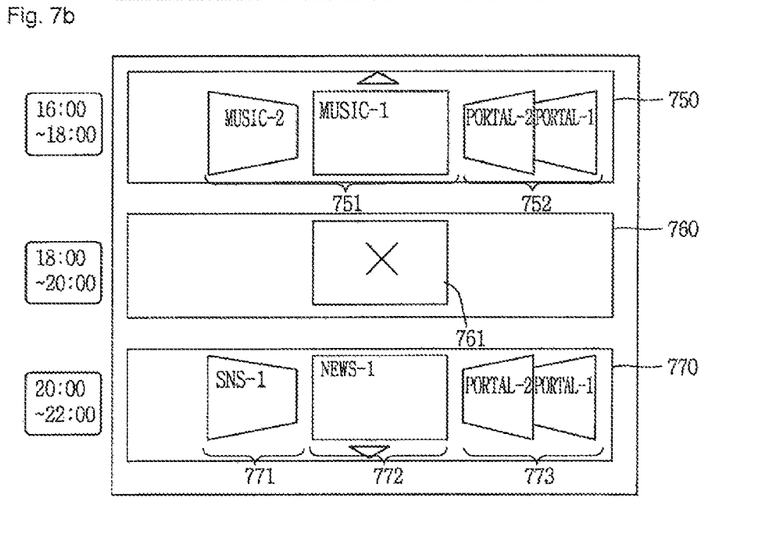

FIGS. 7A and 7B

FIGS. 7A and 7B show a variation for the step (S330) shown in FIG. 3.

FIG. 7A is a view showing a construction for displaying category-based web histories which are not displayed on a screen. When displaying web histories using various images, it may be difficult to display every category-based web history on one screen. Hence, only some of the category-based web histories may be displayed on a screen.

Category-based web histories 720 and 730 which are not displayed may be displayed on a screen upon receiving an additional input of a select button. For example, a select button 711 is a button for displaying on a screen a category-based web history, which is set in the order following the lowest category-based web history displayed on the screen. Hence, when the user inputs the select button 711, the controller 150 may display the category-based web history 730 which was not displayed on the screen. A select button 713 is a button for displaying on a screen a category-based web history which is set in the order preceding the uppermost category-based web history displayed on a screen. Therefore, when the user inputs the select button 713, the controller 150 may display the category-based web history 720 which was not displayed on the screen.

According to such method, every category-based web history may be displayed.

FIG. 7B shows a category-based web history when a vertical axis of the screen is set to a time axis, and a horizontal axis of the screen is set to a category axis.

Webpages displayed on the same vertical axis indicate webpages displayed at the same time zone. Within the same vertical axis, categories may change whenever the horizontal axis is varied.

Referring to FIG. 7B, a first area 751 of a first time zone 750 may include webpages associated with a music category. A second area 752 of the first time zone 750 may include webpages associated with a portal category.

As shown in a second time zone 760, when there is not any webpage displayed on the web browser at the corresponding time zone, non presence of webpage 761 may be indicated.

A first area 771 of a third time zone 770 may include webpages associated with an SNS category. A second area 772 of the third time zone 770 may include webpages associated with a news category. Also, a third area 773 of the third time zone 770 may include webpages associated with a portal category.

As the category-based web histories are displayed, it may be possible to intuitively recognize categories for webpages visited at a specific time zone.

Meanwhile, although it has been described to display a web history in a two-dimensional form, the web history may alternatively be displayable in a three-dimensional form.

For example, although FIG. 7B has showed areas for time are indicated on the vertical axis and areas for categories are indicated on the horizontal axis, a new axis in a back-and-forth direction of the screen will further be introduced.

The new axis may be set to areas for a visit sequence of webpages included in the same category. Alternatively, in addition to the visit sequence, the back-and-forth axis of the screen may be variously set to, for example, an area for time, an area for date, an area for category and the like.

The methods according to the exemplary embodiment of this specification may be employed individually or by combination thereof. Also, steps configuring each exemplary embodiment may be used individually from or by combination with steps constructing a different exemplary embodiment.

The method according to the present disclosure, as described so far, can be implemented in a recording medium readable by a computer or a similar device by use of hardware or software, or any combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof.

For software implementation, the embodiments such as procedures and functions may be implemented together with separate software modules each of which performs at least one of functions and operations. The software codes can be implemented with a software application written in any suitable programming language. Also, the software codes may be stored in a memory and executed by a processor.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for displaying web history in an electronic device, the method comprising:
  displaying, via a user interface displayed on a display of the electronic device, a category name of a first category to be generated and at least one of a keyword or site information of the first category entered by a user;
  displaying, on the display, at least one webpage via a web browser in response to a user input;
  sorting the at least one webpage by category such that the at least one webpage is sorted as the first category based on the at least one of the keyword or the site information of the first category; and
  displaying, on the display, category-based web history for webpages previously displayed on the display when receiving a request for a webpage visit record, wherein the previously displayed webpages are sorted by respectively corresponding categories such that the category-based web history comprises a plurality of categories including the first category associated with the category name of the first category.

2. The method of claim 1, wherein each of the plurality of categories is associated with a corresponding category name and at least one webpage previously displayed on the display.

3. The method of claim 2, wherein each of the plurality of categories comprises a plurality of webpages previously displayed on the display, and wherein the plurality of previously displayed webpages are arranged in an order of having been displayed.

4. The method of claim 3, wherein each of the plurality of categories further comprises a scroll bar in an area in which the plurality of previously displayed webpages are included such that the plurality of previously displayed webpages are scrollable according to movement of the scroll bar.

5. The method of claim 1, wherein:
  a vertical axis of the web history is an axis for a category such that the plurality of categories are arranged along the vertical axis, and
  a horizontal axis of the web history is an axis for a time such that a plurality of previously displayed webpages included in each of the plurality of categories are arranged along the horizontal axis according to a chronological order.

6. The method of claim 1, wherein the previously displayed webpages are further sorted by corresponding time zones such that the web history is displayed with a plurality of time zones, each time zone comprising a corresponding at least one previously displayed webpage.

7. The method of claim 1, further comprising:
acquiring history information relating to webpages displayed via the web browser; and
sorting the webpages based on the history information by each category.

8. The method of claim 7, further comprising storing the category-based web history based on the sorting result.

9. The method of claim 7, wherein the sorting the webpages comprises sorting the webpages by each category, based on information included in the webpages.

10. The method of claim 1, further comprising receiving an input for selecting at least one category from a plurality of preset categories such that previously displayed webpages are sorted by the selected at least one category.

11. The method of claim 10, wherein the plurality of preset categories comprise at least news, social networking service (SNS), music, movie, or sports.

12. The method of claim 10, further comprising grouping a series of webpages displayed via links included in the series of webpages into one category.

13. The method of claim 1, wherein at least two of the plurality of categories are displayed together on the display when the category-based web history is displayed.

14. The method of claim 13, wherein the at least two of the plurality of categories are arranged along a vertical axis, each of the at least two of the plurality of categories identified by a corresponding category name, such that at least two different categories are displayed in at least two rows on the display.

15. The method of claim 14, wherein at least one of the at least two of the plurality of categories comprises a plurality of webpages, which are previously displayed on the display and sorted by the at least one of the at least two of the plurality of categories, the plurality of webpages in the at least one of the at least two of the plurality of categories arranged along a horizontal axis.

16. The method of claim 15, wherein each of the plurality of webpages in the at least one of the at least two of the plurality of categories is identified by a corresponding name of the webpage.

17. An electronic device comprising:
a user input unit;
a display;
a memory to store web history; and
a controller configured to:
cause the display to display a user interface such that a category name of a first category and at least one of a keyword or site information of the first category, entered by a user via the user input unit, are displayed via the user interface;
cause the display to display at least one webpage via a web browser in response to a user input;
sort the at least one webpage by category such that the at least one webpage is sorted as the first category based on the at least one of the keyword or the site information of the first category; and
cause the display to display category-based web history for webpages previously displayed on the display when a request for a webpage visit record is received,
wherein the previously displayed webpages are sorted by respectively corresponding categories such that the category-based web history comprises a plurality of categories including the first category associated with the category name of the first category.

* * * * *